United States Patent
Sakurai et al.

(10) Patent No.: US 10,483,817 B2
(45) Date of Patent: Nov. 19, 2019

(54) ROTOR FOR AN ELECTRIC MOTOR INCLUDING A STRUCTURE FOR RETAINING ROTOR SEGMENTS AND PERMANENT MAGNETS ON A HUB THEREOF

(71) Applicants: Equipmake Ltd, Norwich (GB); aim CO., LTD., Nagoya, Aichi (JP)

(72) Inventors: Yoshitoshi Sakurai, Kanagawa (JP); Ian Foley, Norfolk (GB); Martin Ogilvie, Norfolk (GB)

(73) Assignees: Equipmake Ltd, Norwich (GB); aim CO., Ltd., Nagoya-shi, Aichi (JP)

( * ) Notice: Subject to any disclaimer, the term of this patent is extended or adjusted under 35 U.S.C. 154(b) by 189 days.

(21) Appl. No.: 14/905,441

(22) PCT Filed: Jul. 15, 2014

(86) PCT No.: PCT/GB2014/052160
§ 371 (c)(1),
(2) Date: Jan. 15, 2016

(87) PCT Pub. No.: WO2015/008058
PCT Pub. Date: Jan. 22, 2015

(65) Prior Publication Data
US 2016/0164356 A1 Jun. 9, 2016

(30) Foreign Application Priority Data

Jul. 16, 2013 (GB) .................................. 1312677.6

(51) Int. Cl.
*H02K 1/27* (2006.01)
*H02K 1/28* (2006.01)
(52) U.S. Cl.
CPC ............. *H02K 1/2773* (2013.01); *H02K 1/28* (2013.01)

(58) Field of Classification Search
CPC .............................. H02K 1/2773; H02K 1/28
(Continued)

(56) References Cited

U.S. PATENT DOCUMENTS 3,031,593 A 4/1962 Carnetti
3,742,595 A 7/1973 Lykes
(Continued)

FOREIGN PATENT DOCUMENTS

CN 201113681 Y 9/2008
CN 102684337 A 9/2012
(Continued)

OTHER PUBLICATIONS

Espacenet, English Machine Translation of Abstract of CN202524184U, published on Nov. 7, 2012, retrieved from http://worldwide.espacenet.com on Feb. 5, 2016 (2 pages).
(Continued)

*Primary Examiner* — Michael Andrews
(74) *Attorney, Agent, or Firm* — Wood Herron & Evans LLP

(57) ABSTRACT

A rotor suitable for use in an electric motor or generator. The rotor comprises a hub having a central axis, a plurality of rotor segments and permanent magnets, and an assembly for retaining the segments on the hub. The segments are arranged around the hub to define at least two rings, which are adjacent to each other in the axial direction with a permanent magnet disposed between each of the segments in each ring. The assembly includes a plurality of rods which extend in an axial direction to retain the rotor segments. An intermediate plate is located between each ring of segments through which the rods pass, wherein the intermediate plates and the outer circumferential surface of the hub engage with each other in such a way as to allow the intermediate plates to move axially along the hub.

16 Claims, 4 Drawing Sheets

(58) Field of Classification Search
USPC .................... 310/156.13, 156.59, 156.61
See application file for complete search history.

(56) References Cited

U.S. PATENT DOCUMENTS

| | | | |
|---|---|---|---|
| 4,498,024 A * | 2/1985 | Moretti | H02K 9/19 310/156.61 |
| 4,999,533 A | 3/1991 | King et al. | |
| 5,039,897 A | 8/1991 | Iwamatsu et al. | |
| 5,347,188 A | 9/1994 | Iseman et al. | |
| 5,463,262 A | 10/1995 | Uchida | |
| 5,670,838 A | 9/1997 | Everton | |
| 5,786,650 A * | 7/1998 | Uchida | H02K 1/2773 310/156.55 |
| 5,796,190 A | 8/1998 | Takeda et al. | |
| 5,952,755 A * | 9/1999 | Lubas | H02K 1/08 310/156.19 |
| 6,762,520 B1 | 7/2004 | Ehrhart et al. | |
| 8,446,121 B1 | 5/2013 | Parsa et al. | |
| 2002/0047424 A1* | 4/2002 | Varenne | H02K 1/2773 310/156.01 |
| 2004/0004407 A1* | 1/2004 | Laurent | H02K 1/2773 310/156.48 |
| 2008/0024018 A1* | 1/2008 | Rignault | H02K 1/2773 310/424 |
| 2008/0136271 A1 | 6/2008 | Alfermann et al. | |
| 2010/0231066 A1 | 9/2010 | Korner | |
| 2010/0231067 A1 | 9/2010 | Ruffing et al. | |
| 2012/0181880 A1 | 7/2012 | Zhao et al. | |
| 2012/0326548 A1* | 12/2012 | Nonaka | H02K 1/2773 310/156.19 |
| 2013/0049493 A1* | 2/2013 | Zhao | H02K 1/2773 310/43 |
| 2013/0229082 A1 | 9/2013 | Zhang et al. | |
| 2014/0191609 A1* | 7/2014 | Woo | H02K 1/2773 310/156.38 |

FOREIGN PATENT DOCUMENTS

| | | |
|---|---|---|
| CN | 202524184 U | 11/2012 |
| CN | 202918133 U | 5/2013 |
| DE | 202005021025 U1 | 12/2006 |
| EP | 0449538 A1 | 10/1991 |
| EP | 0822641 A2 | 2/1998 |
| EP | 0866540 A2 | 9/1998 |
| EP | 1333561 A2 | 8/2003 |
| EP | 2523314 A2 | 11/2012 |
| EP | 2544335 A2 | 1/2013 |
| GB | 796970 A | 6/1958 |
| GB | 883827 A | 12/1961 |
| GB | 965801 A | 8/1964 |
| GB | 1246353 A | 9/1971 |
| GB | 1294561 A | 11/1972 |
| GB | 2159340 A | 11/1985 |
| GB | 2269707 A | 2/1994 |
| GB | 2396971 A | 7/2004 |
| JP | S63100947 U | 6/1988 |
| JP | H02193546 A | 7/1990 |
| JP | 2003052155 A | 2/2003 |
| JP | 2003158842 A | 5/2003 |
| JP | 2010288373 A | 12/2010 |
| WO | 9200627 A1 | 1/1992 |
| WO | 0048290 A1 | 8/2000 |
| WO | 2012085281 A2 | 6/2012 |

OTHER PUBLICATIONS

United Kingdom Intellectual Property Office, Patents Act 1977: Search Report under Section 17, Application No. GB1312677.6, dated Dec. 23, 2013 (2 pages).
Espacenet, English Machine Translation of Abstract of CN102684337A, published on Sep. 19, 2012, retrieved from http://worldwide.espacenet.com on Jan. 7, 2016 (2 pages).
European Patent Office, International Search Report and Written Opinion of the International Searching Authority, International Application No. PCT/GB2014/052160, dated Sep. 3, 2015 (13 pages).
Espacenet, English Machine Translation of Abstract for JPH02193546A, published on Jul. 31, 1990, retrieved from http://worldwide.espacenet.com on Jan. 6, 2016 (2 pages).
Espacenet, English Machine Translation of Abstract for JP2003052155A, published on Feb. 21, 2003, retrieved from http://worldwide.espacenet.com on Jan. 6, 2016 (2 pages).
Espacenet, English Machine Translation of Abstract for DE202005021025U1, published on Dec. 28, 2006, retrieved from http://worldwide.espacenet.com on Jan. 6, 2016 (1 page).
Espacenet, English Machine Translation of Abstract for CN201113681Y, published on Sep. 10, 2008, retrieved from http://worldwide.espacenet.com on Jan. 6, 2016 (1 page).
Espacenet, English Machine Translation of Abstract for JP2010288373A, published on Dec. 24, 2010, retrieved from http://worldwide.espacenet.com on Jan. 6, 2016 (2 pages).
Espacenet, English Machine Translation of Abstract for CN202918133U, published on May 1, 2013, retrieved from http://worldwide.espacenet.com on Jan. 6, 2016 (1 page).
European Patent Office, International Search Report and Written Opinion of the International Searching Authority, International Application No. PCT/GB2014/052159, dated Aug. 17, 2015 (16 pages).
United Kingdom Intellectual Property Office, Patents Act 1977: Search Report under Section 17, Application No. GB1312678.4, dated Jan. 7, 2014 (2 pages).
United Kingdom Intellectual Property Office, Patents Act 1977 Further Search Report under Section 17, Application No. GB1312678.4, dated Jun. 19, 2014 (2 pages).
Espacenet, EPO and Google, English Machine Translation of JP2010288373A, published on Dec. 24, 2010, retrieved from http://worldwide.espacenet.com and http://translationportal.epo.org on Feb. 12, 2018 (9 pages).

* cited by examiner

ROTOR FOR AN ELECTRIC MOTOR INCLUDING A STRUCTURE FOR RETAINING ROTOR SEGMENTS AND PERMANENT MAGNETS ON A HUB THEREOF

CROSS-REFERENCE TO RELATED APPLICATIONS

This application is a submission under 35 U.S.C. § 371 of International Application No. PCT/GB2014/052160, filed Jul. 15, 2014, which claims priority to Great Britain Application No. 1312677.6, filed Jul. 16, 2013, the disclosures of which are hereby expressly incorporated by reference herein in their entireties.

FIELD OF THE INVENTION

The present invention relates to a rotor suitable for use in an electric motor or generator. More particularly, it concerns the structural configuration of such a rotor.

BACKGROUND OF THE INVENTION

Rotors for use in motors such as brushless DC motors include permanent magnets held within the rotor. Torque is applied by a rotating magnetic field. This is created by applying current, usually in three separate phases, to stationary coils mounted in an outer stator. This type of motor is becoming increasingly popular due to advances in the control and power electronics required to electrically commutate the current supply to the stator. Such machines are often called motors but may equally be used as motors, generators or motor/generators.

In existing rotor configurations, the permanent magnets are retained in position by a cylindrical sleeve which extends around the outer circumferential surface of the rotor.

SUMMARY OF THE INVENTION

The present invention provides a rotor for an electric motor, the rotor comprising:
a hub having a central axis;
a plurality of rotor segments arranged around the hub;
a plurality of permanent magnets; and
an assembly for retaining the segments on the hub,
wherein the assembly includes a plurality of rods which extend in an axial direction so as to retain respective rotor segments,
the segments are arranged around the hub to define at least two rings, which are adjacent to each other in the axial direction, and
the rotor includes an intermediate plate between each ring of segments, wherein the rods pass through each intermediate plate.

The segment retaining assembly may include a plurality of elongate members such as rods which extend in an axial direction and are arranged to retain the rotor segments on the hub. They may engage with a respective segment in each ring. Preferably, the rods extend through a segment in each ring. The ends of the rods are rigidly coupled to the hub of the rotor and serve to retain the segments in position. The ends of the rods engage with structures which restrain the rods against movement in a radial direction. These structures may, for example, be in the form of a pair of end plates which are coupled to respective ends of the rods. The end plates may be substantially annular and extend around the hub. The plates may be separate components which are fixed on to the hub, or alternatively, one or both of the plates may be integrally formed with the hub.

To provide further support to the rods, a substantially annular intermediate plate may be provided between each ring of segments which acts on and/or engages with each of the rods so as to restrain them against centrifugal forces. In a preferred embodiment, the rods pass through each intermediate plate. Preferably, each ring has a permanent magnet disposed between each of the segments, and the magnets and segments engage with each other in such a way that the segments restrain the magnets against radially outward forces. Thus, the rods retain the segments radially, and the segments in turn restrain the magnets radially.

Preferably, the intermediate plates engage with an outer circumferential surface of the hub so as to resist rotation of the intermediate plates around the hub. The plates thereby serve to restrain movement of the rods and therefore the segments against forces acting in circumferential and radial directions. They also assist transmission to the hub of torque acting on the magnets and rotor segments, which is transferred to the plates by the rods.

The intermediate plates and the outer circumferential surface of the hub may engage with each other in such a way as to allow the intermediate plates to move axially along the hub. This facilitates the assembly of the rotor. It also allows for differential thermal expansion of components of the rotor, it ensures that the plates take radial load only, and it accommodates variations in the dimensions of rotor components, increasing the tolerances associated with their manufacture. In a preferred embodiment, a plurality of axially extending splines are defined by the outer circumferential surface of the hub for engagement with the intermediate plates.

Each rotor segment preferably defines a hole therethrough for receiving a respective rod of the segment retaining assembly. Each segment has a radially innermost surface and a radially outermost surface relative to the central axis of the motor hub. The hole in each segment is preferably located closer to its radially innermost surface than its radially outermost surface. This is because the amount of magnetic flux change in the segment during operation of the motor tends to be lower towards the inner end of the segment. It is desirable to locate the hole where the flux change is lower as this will result in lower eddy current losses within the bolt passing through the rotor segments at this position. These eddy currents will generate heat, making it more difficult to keep the motor sufficiently cool.

In preferred embodiments, the hole is located closer to the region of lowest magnetic flux change in the segment during operation of the motor than the region of highest magnetic flux change during operation of the motor. More preferably, the hole is located at the region of lowest magnetic flux change during operation of the motor. This will tend to minimise the eddy current losses in the rods, reducing the amount of cooling required for the motor.

The present invention also provides a rotor for an electric motor, the rotor comprising:
a hub having a central axis;
a plurality of rotor segments;
a plurality of permanent magnets; and
an assembly for retaining the segments on the hub,
wherein the segments are arranged around the hub to define at least two rings which are adjacent to each other in the axial direction, with a permanent magnet disposed between each of the segments in each ring.

The use of separate rotor segments reduces inductive losses. It also reduces heat build-up in the rotor as the use of multiple segments provides a much greater surface area through which to dissipate heat. Also, the axial length of the rotor can readily be altered to suit differing requirements by varying the number of rings of segments around the rotor.

The assembly for retaining the segments is configured so that it is provided within the outer cylindrical surface defined by the segments. It does not extend over the outwardly facing surfaces of the segments and magnets, and this enables the distance between the rotor and a stator to be reduced, thereby increasing the efficiency of the motor. Also, unlike known rotors in which the magnets are retained by an outer sleeve, such an assembly configuration does not impede the dissipation of heat from the outer surfaces of the magnets and segments, and so they are exposed for direct contact with a surrounding cooling fluid (air, for example).

The present invention further provides a rotor for an electric motor, the rotor comprising:
a hub having a central axis;
a plurality of rotor segments arranged around the hub in a ring; and
a plurality of permanent magnets,
wherein the magnets and the segments engage with each other in such a way that the segments restrain the magnets against radially outward forces.

Preferably, the respective shapes of the rotor segments and permanent magnets are selected so that, in the assembled rotor, the rotor segments restrain the permanent magnets against radially outward forces. For example, a portion of some of the segments may extend radially outwards beyond adjacent magnets and also extend circumferentially at least part way over the magnets to restrain them against radially outward forces. In a preferred embodiment, each segment extends radially outwards beyond the two adjacent magnets and extends circumferentially at least part way over the magnets to provide the restraint against radially outward forces. This avoids the need for an additional sleeve around the rotor to retain the permanent magnets, whilst leaving at least part of the outwardly facing sides of the magnets exposed to assist cooling.

The magnets and the hub may be shaped so as to engage with each other in such a way that the hub restrains the magnets in the circumferential direction. In embodiments, the magnets may be received in grooves formed in the outer circumferential surface of the hub.

BRIEF DESCRIPTION OF THE DRAWINGS

Embodiments of the present invention will now be described by way of example and with reference to the accompanying schematic drawings, wherein.

DETAILED DESCRIPTION OF THE INVENTION

In the following discussion, some dimensions are given. It will be appreciated that these dimensions are merely given to provide examples of relative sizes and proportions of the features concerned, and may be varied and/or scaled to suit different requirements.

Figure 1:
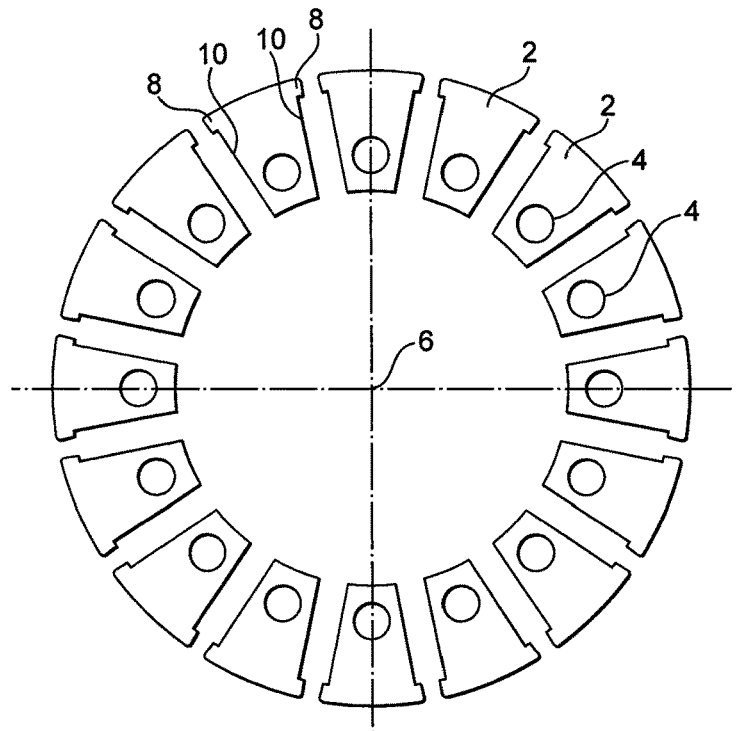
FIG. 1 illustrates an end view of rotor segments in an arrangement adopted when the segments are located around the axis of a rotor according to an embodiment of the present invention.

FIG. 1 shows a plurality of separate laminated rotor segments 2 formed of material having a high magnetic permeability and arranged in a ring-shaped distribution for location around the hub of a rotor according to the present invention. The segments are equally circumferentially spaced apart and are equidistant from an axis of rotation 6 which extends perpendicular to the plane of the drawing. Each segment defines an elongate channel or hole 4 which passes therethrough in an axial direction. The radially outermost portion of each segment defines a projection or lip 8 which extends in the circumferential direction (by about 1 mm) beyond the respective side face 10 of the segment. The segments may be formed of silicon or cobalt steel or another material suitable for motor laminations.

The holes 4 are located on a radial centre line of the segments at a position closer to the innermost ends of the segments than the outermost ends. In particular, they are located at the region or area where the magnetic flux change in the segment during operation of the motor is the lowest. This serves to minimise eddy current losses caused within supporting rods passing through these holes. The area of lowest magnetic flux change in the segment may be determined using a magnetic finite element analysis program to model the magnetic flux change in the segment as the motor rotates under load in normal operation.

Figure 2:
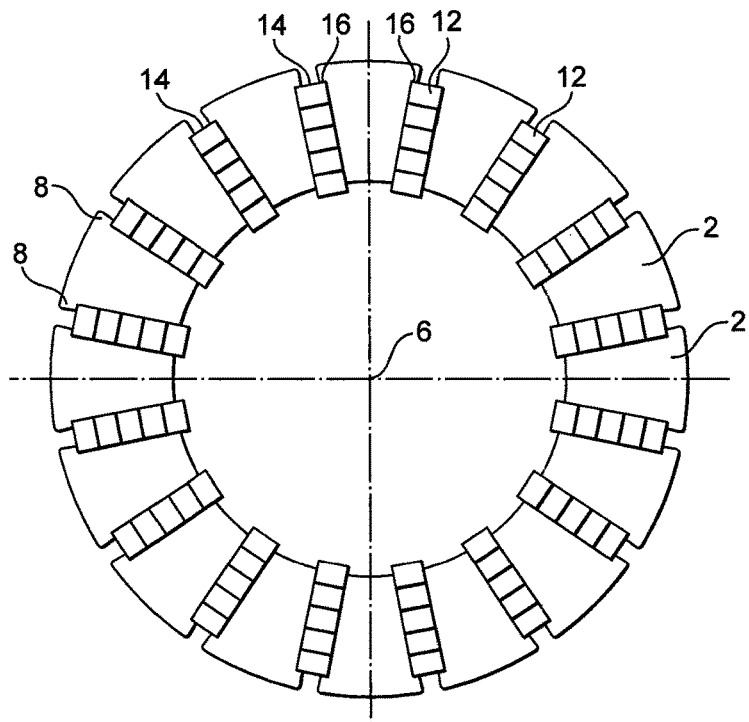
FIG. 2 is an end view of permanent magnets disposed around the axis of a rotor, with the rotor segments shown in outline only.

FIG. 2 shows the rotor segments 2 of FIG. 1 in outline only with a permanent magnet 12 disposed between each pair of adjacent segments, in the configuration that is adopted in the assembled rotor. The magnets are typically of "rare earth" type. Their dimensions may be 5 mm wide by 20 mm long (in the axial direction) by 25 mm, for example.

The outwardly facing exposed side 14 of each magnet is in engagement with an inwardly facing surface 16 of the lips 8 of the adjacent segments. The lips extend circumferentially part way across the sides 14 of each of the magnets, with a gap of about 3 mm between them, for example. Thus, the magnets are retained at a location spaced from the rotor's outside diameter. The segments and magnets may be around 20 mm long in the axial direction.

Retention of the magnets by the lips formed on the rotor segments avoids encasing the rotor with a sleeve. This enables the width of the air gap between the rotor and the surrounding stator to be reduced. Also, a sleeve tends to inhibit heat loss from the rotor. As the lips 8 only extend part way across the magnets, this facilitates direct contact between cooling air and the surface of the magnets. The groove defined adjacent to the side 14 of each magnet encourages air turbulence adjacent to the magnets, assisting the cooling action.

Figure 3:
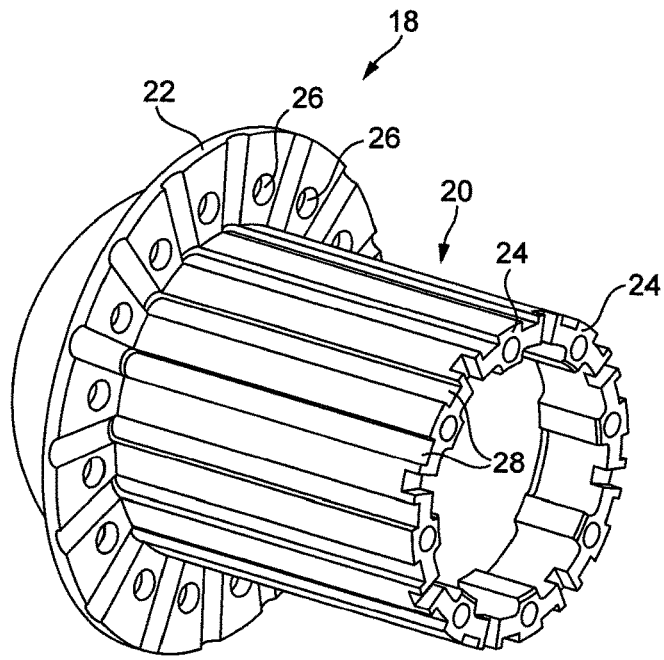
FIG. 3 is a perspective view of a rotor hub according to an embodiment of the present invention.

A rotor hub configuration for use with the segments and magnets shown in FIGS. 1 and 2 is illustrated in FIG. 3. The hub 18 includes a cylindrical body portion 20 and an end plate 22. The outer surface of the cylindrical portion 20 has axial grooves 28 formed therein to define a plurality of axially extending splines 24. The hub may be formed of titanium or non-magnetic stainless steel, for example.

The end plate 22 is substantially annular and integrally formed with the cylindrical portion 20. The end plate defines a plurality of axially extending cavities 26 (for receiving rods referred to below).

As illustrated in FIG. 2, the magnets 12 may be arranged such that they extend radially inwards beyond the segments 2. During assembly of the rotor, the magnets are located circumferentially on the hub by partial insertion into the grooves 28 defined between the splines 24. As well as assisting the assembly process, this also means that the magnets can transmit applied forces directly to the hub. Furthermore, location of the magnets into the hub in this way means that the magnets restrain the rotor segments against rotation thereof relative to the hub.

Figure 4:
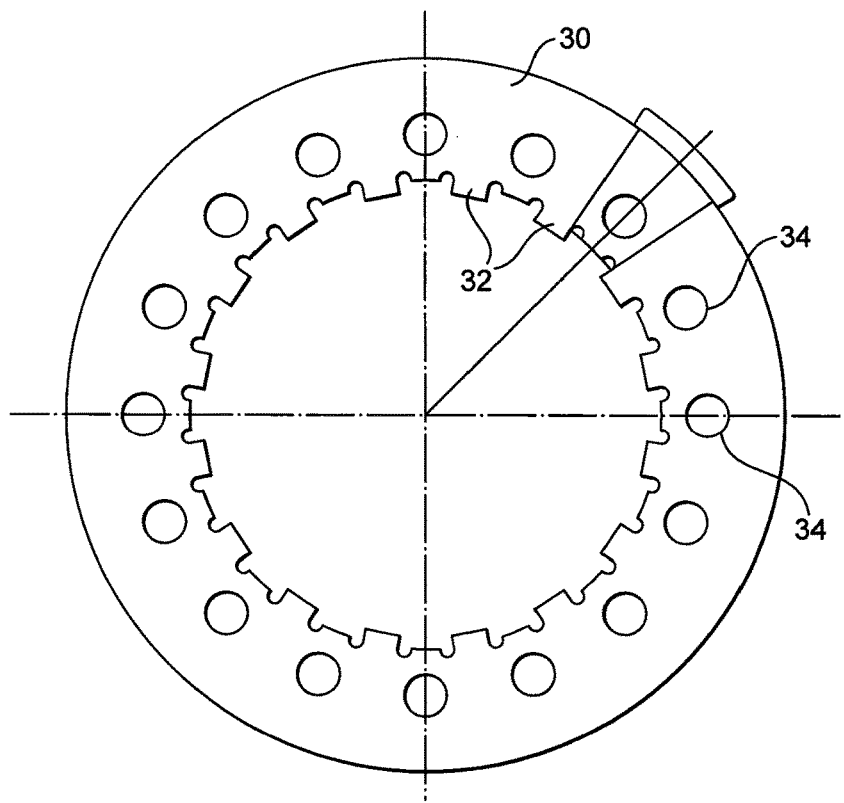
FIG. 4 is a side view of an intermediate plate for use in combination with the hub of FIG. 3.

An intermediate support plate 30 is shown in FIG. 4. It is substantially annular and defines a series of inwardly directed projections 32 for location on either side of the splines 24 of the hub. Plate 30 also defines a plurality of circumferentially spaced apart holes 34 for receiving the supporting rods referred to below. In the assembled rotor, an intermediate plate 30 is inserted between adjacent rings of rotor segments. It may be formed of titanium or non-magnetic steel, for example.

Figure 5:
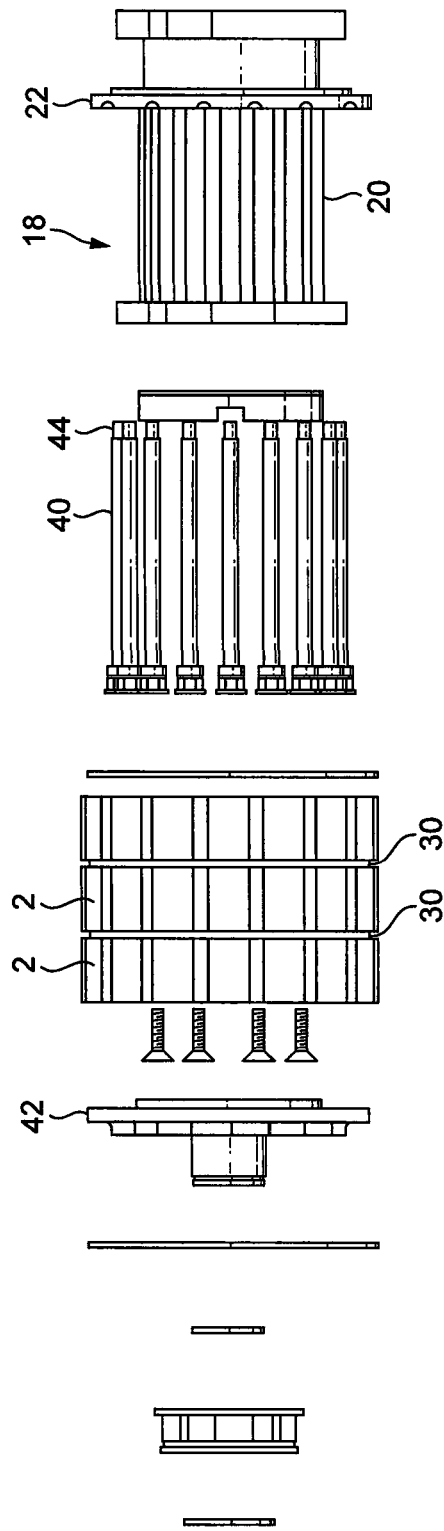
FIG. 5 is an exploded side view of a rotor according to an embodiment of the present invention.

An exploded side view of components of a rotor embodying the present invention is shown in FIG. 5. The rotor segments 2 are held in position on the hub 18 by passing a series of rods 40 through an outer end plate 42, the rotor segments 2 and the interleaved intermediate plates 30, and into the cavities 26 defined in the other end plate 22. The rods may be in the form of bolts having threads 44 at one end for engagement with complimentary threads defined in the cavities 26 or nuts located on the far side of the plate 22. They may have a diameter of about 6 mm and a length of around 70 mm, and be formed of high tensile steel, for example. The magnets may be securely bonded in position using a suitable adhesive.

Instead of bolts, studs may be used which engage with a threaded flange or a nut at each end. Alternatively, rods may be used which pass through the segments and are retained axially in some way. For example, the ends of the rods may engage flanges which are either coupled to or formed integrally with the hub.

The intermediate plates 30 float axially and transmit torque to the central hub via the splines 24. They enable for the use of smaller diameter rods 40 for a given rotor stiffness, enabling the rotor to be more compact.

Figure 6:
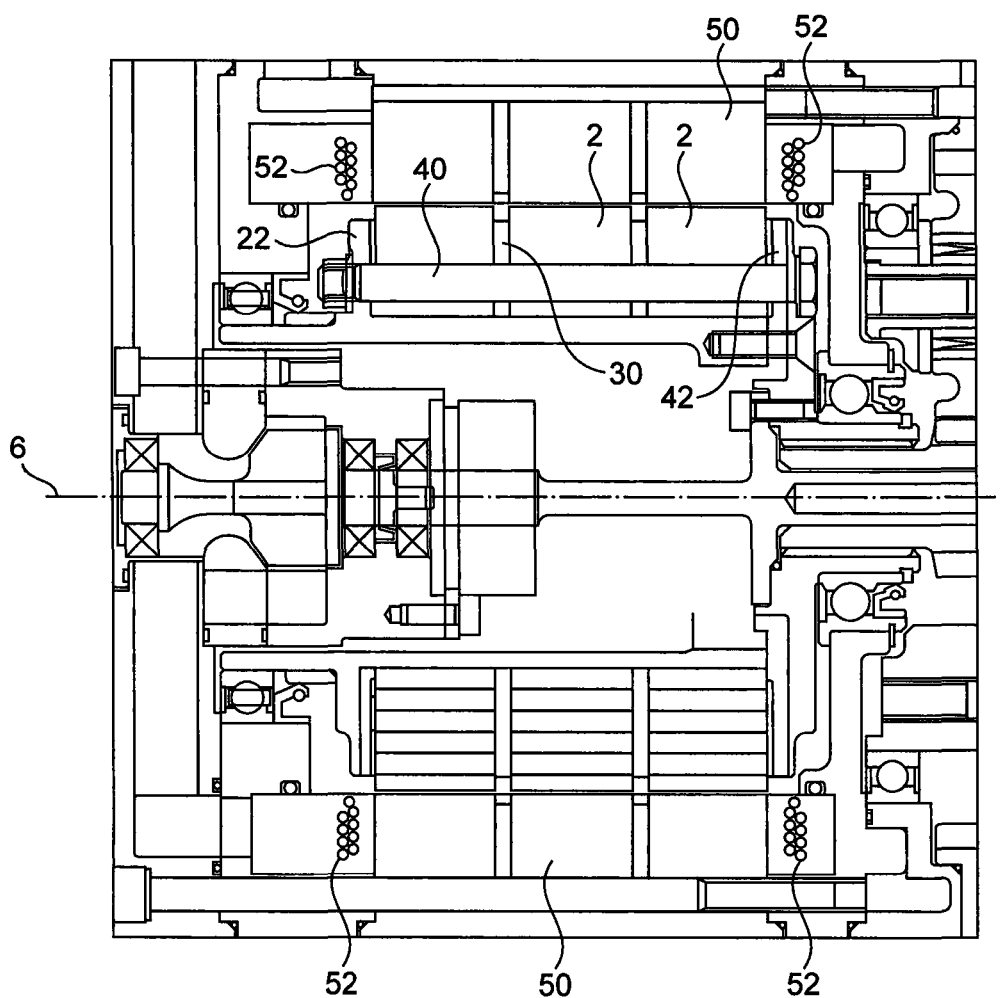
FIG. 6 is a cross-section partial side view of an assembled electric motor including a rotor embodying the present invention.

A cross-sectional view of part of a motor including a rotor embodying the present invention is shown in FIG. 6. The rotor is mounted for rotation about axis 6 within a stator 50 having stator coils 52.

Separating the rotor into rings of segments provides a modular, extendible design. The present approach increases the rotor stiffness and so decreases diametrical growth of the rotor during rotation. This allows the rotor-to-stator gap to be reduced, leading to more torque-per-amp of applied power. Alternatively, smaller diameter rods could be used whilst still satisfying a given rotor growth target. Consequently the diameter of the rotor can be reduced, making the motor itself more compact.

While the present invention has been illustrated by description of various embodiments and while those embodiments have been described in considerable detail, it is not the intention of Applicants to restrict or in any way limit the scope of the appended claims to such details. Additional advantages and modifications will readily appear to those skilled in the art. The present invention in its broader aspects is therefore not limited to the specific details and illustrative examples shown and described. Accordingly, departures may be made from such details without departing from the spirit or scope of Applicants' invention.

What is claimed is:

1. A rotor for an electric motor, the rotor comprising:
a hub having a central axis;
a plurality of rotor segments arranged around the hub;
a plurality of permanent magnets; and
an assembly for retaining the segments on the hub,
wherein the assembly includes a plurality of rods which extend in an axial direction so as to retain respective rotor segments,
the segments are arranged around the hub to define at least two rings, which are adjacent to each other in the axial direction,
the rotor includes an intermediate plate between each ring of segments, wherein the rods pass through each intermediate plate,
wherein the magnets and the hub are shaped so as to engage with each other in such a way that the hub restrains the magnets in the circumferential direction, with each magnet received by and in direct engagement with a parallel-sided groove defined by an outer circumferential surface of the hub, and the intermediate plate between each ring of segments defines a series of inwardly directed projections in engagement with the grooves in the hub in such a way as to resist rotation of the intermediate plate between each ring of segments around the axis of the hub.

2. A rotor of claim 1, wherein the intermediate plate between each ring of segments and the outer circumferential surface of the hub engage with each other in such a way as to allow the intermediate plate between each ring of segments to move axially along the hub.

3. A rotor of claim 2, wherein a plurality of axially extending splines are defined by the outer circumferential surface of the hub and engage with the intermediate plate between each ring of segments.

4. A rotor of claim 1, wherein each segment defines a hole therethrough for receiving a respective rod, a radially innermost surface and a radially outermost surface, and the hole is located closer to the radially innermost surface than the radially outermost surface.

5. A rotor of claim 4, wherein the hole is located closer to a point of lowest magnetic flux change in the segment during operation of the motor than a point of highest magnetic flux change during operation of the motor.

6. A rotor of claim 5, wherein the hole is located at the point of lowest magnetic flux change in the segment during operation of the motor.

7. A rotor of claim 1, wherein the segments are arranged around the hub, with a permanent magnet disposed between each of the segments.

8. A rotor of claim 1, wherein the magnets and the segments engage with each other in such a way that the segments restrain the magnets against radially outward forces.

9. A rotor of claim 1, wherein the assembly is configured so that it does not extend radially outwardly beyond the greatest radial extent of the rotor segments.

10. A rotor of claim 1, including a pair of end plates which are coupled to respective ends of the rods.

11. A rotor of claim 10, wherein either or both of the end plates are substantially annular and extend around the hub.

12. A rotor of claim 10, wherein either or both of the end plates are fixed onto the hub.

13. A rotor of claim 10, wherein either or both of the end plates are integrally formed with the hub.

14. A rotor of claim 1, wherein a portion of at least one segment extends radially outwards beyond an adjacent magnet, and the portion extends circumferentially at least part way over the magnet to restrain the magnet against radially outward forces.

15. A rotor of claim 14, wherein a portion of each segment extends radially outwards beyond the two adjacent magnets, and the portion extends circumferentially at least part way over the two adjacent magnets to restrain them against radially outward forces.

16. An electric motor including a rotor of claim 1.

* * * * *